US007707552B2

(12) United States Patent
Schmidt et al.

(10) Patent No.: US 7,707,552 B2
(45) Date of Patent: Apr. 27, 2010

(54) METHOD AND SYSTEM FOR AUTONOMICALLY PRIORITIZING SOFTWARE DEFECTS

(75) Inventors: David L. Schmidt, Cary, NC (US); Theodore F. Rivera, Raleigh, NC (US); Scott A. Will, Wake Forest, NC (US)

(73) Assignee: International Business Machines Corporation, Armonk, NY (US)

( * ) Notice: Subject to any disclaimer, the term of this patent is extended or adjusted under 35 U.S.C. 154(b) by 1227 days.

(21) Appl. No.: 11/163,370

(22) Filed: Oct. 17, 2005

(65) Prior Publication Data
US 2007/0089092 A1   Apr. 19, 2007

(51) Int. Cl.
G06F 9/44 (2006.01)
(52) U.S. Cl. .................. 717/124; 717/125; 717/126; 714/38; 714/57
(58) Field of Classification Search .................. None
See application file for complete search history.

(56) References Cited

U.S. PATENT DOCUMENTS

| 2002/0133806 | A1 | 9/2002 | Flanagan et al. |
| 2004/0205717 | A1 | 10/2004 | Chiang et al. |
| 2004/0205727 | A1 | 10/2004 | Sit et al. |
| 2006/0041864 | A1* | 2/2006 | Holloway et al. ........... 717/124 |
| 2006/0282267 | A1* | 12/2006 | Lopez-Barquilla et al. .. 704/257 |

* cited by examiner

Primary Examiner—Lewis A Bullock, Jr.
Assistant Examiner—Mark A Gooray
(74) Attorney, Agent, or Firm—Charles L. Moore; Moore & Van Allen, PLLC

(57) ABSTRACT

A method for autonomically prioritizing software defects may include applying at least one static analysis tool to a body of source code to generate a report in response to any perceived defects. The method may also include performing a delta analysis on a group of data that may include the report, a previously generated report, and one of a default priority scheme and a previously generated priority list to generate a refined priority list of types of software defects.

15 Claims, 5 Drawing Sheets

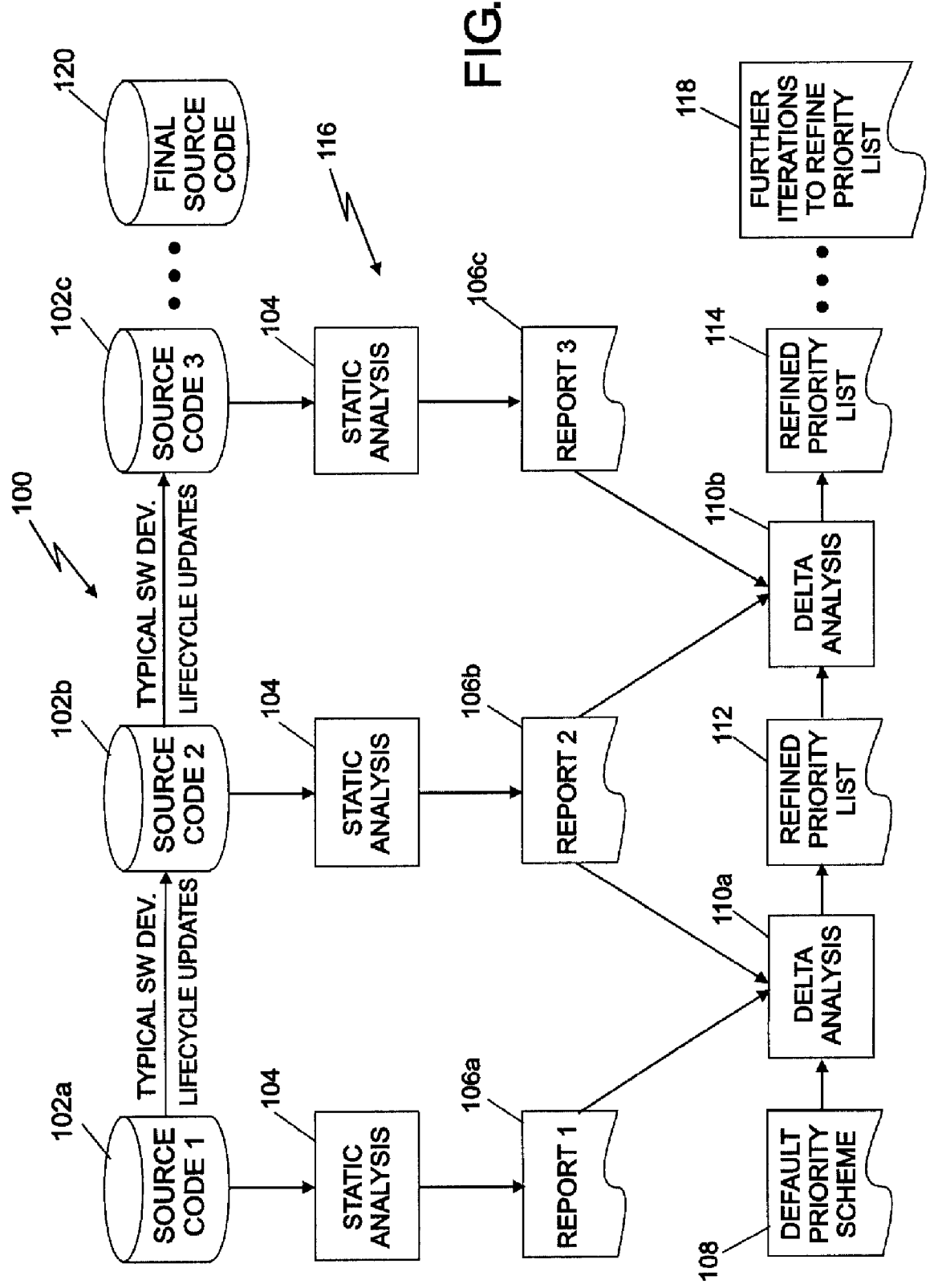

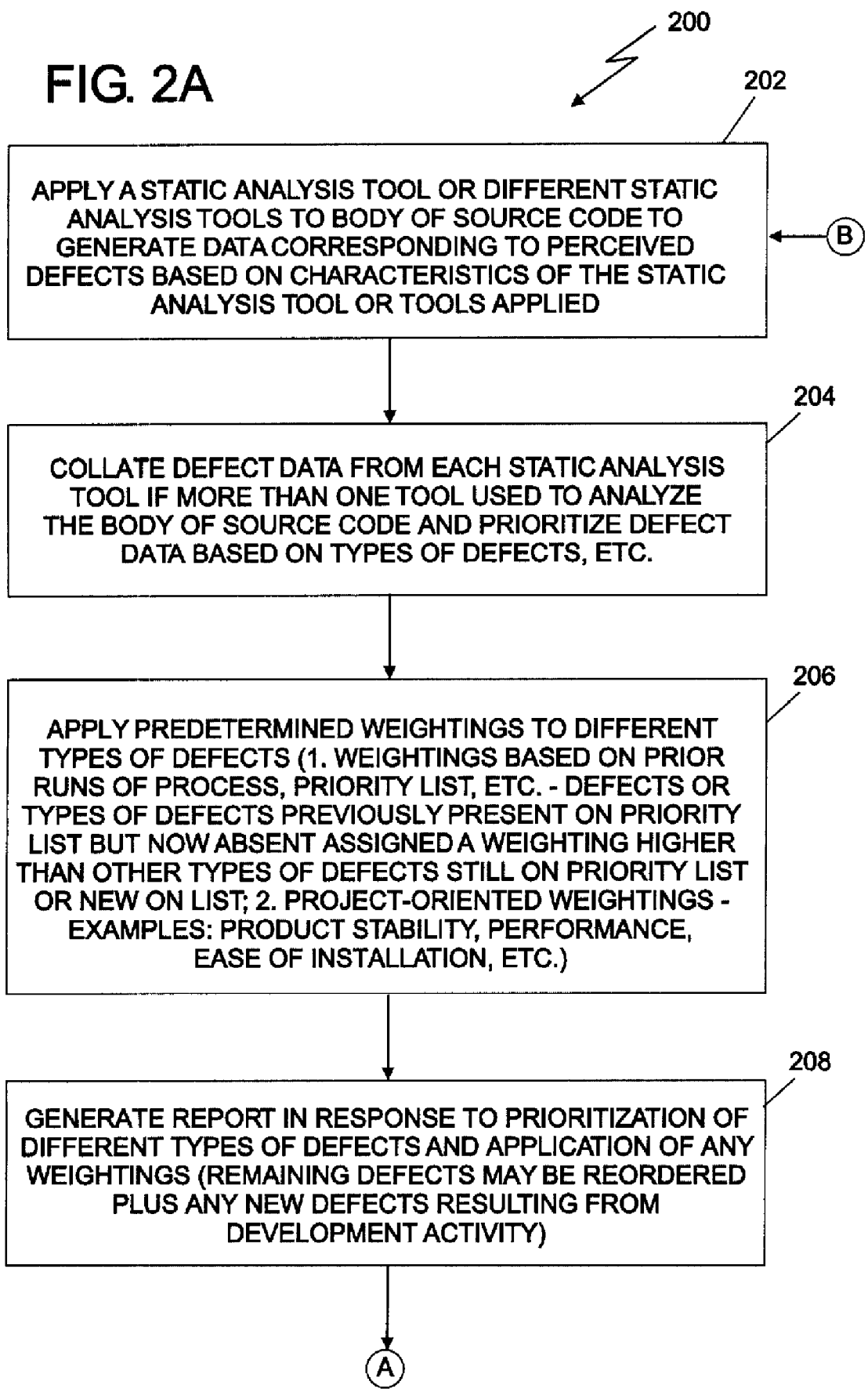

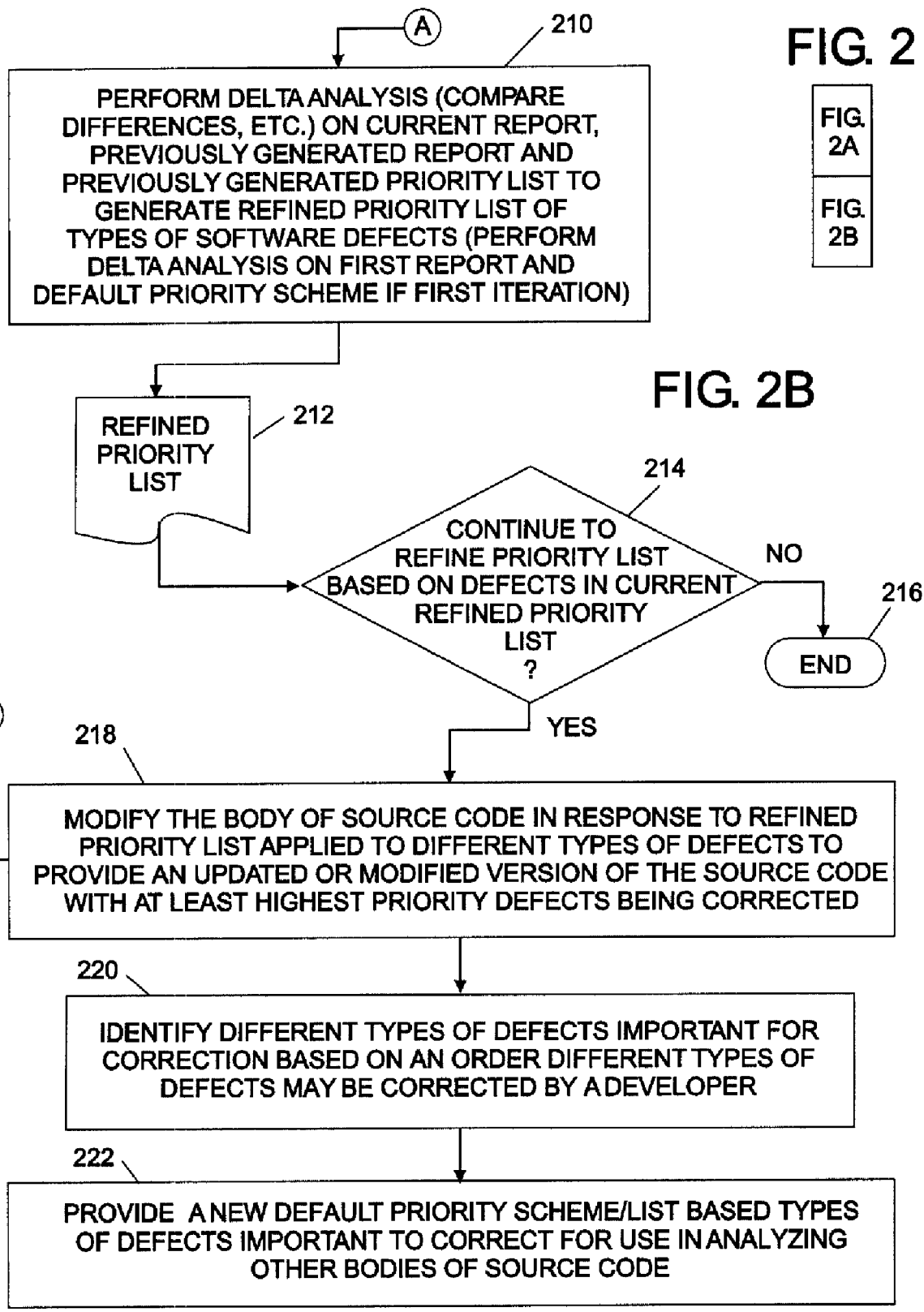

METHOD AND SYSTEM FOR AUTONOMICALLY PRIORITIZING SOFTWARE DEFECTS

BACKGROUND OF THE INVENTION

The present invention relates to software and software development, and more particularly to a method and system for autonomically prioritizing software defects using programmatic static analysis or the like of computer source code.

Static analysis may be broadly defined as analyzing software or source code for the purpose of identifying possible defects without actually executing the software. Examples of commercially available tools for performing static analysis may include FindBugs available from SourceForge.net, JTest or C++ Test available from the Parasoft Corporation, Monrovia, Calif. These are examples of programmatic static analyzers that "read" software source code and report perceived defects. The total number of defects reported by such static analysis tools is typically high compared to the number of defects software developers may actually be motivated to fix or correct. Developers typically need to filter the multitude of potential defects and then prioritize the defects for correction. This can be time consuming and tedious and needs to be done for each revision, modification or new version of the same source code and for each new body of source code. These systems do not provide a means to autonomically re-prioritize defects after modification during typical software development or lifecycle updates. These systems also do not provide any mechanism to track which types of defects may be more important than others to a developer or an order in which a developer may approach fixing or correcting different types of defects based on a particular developer's pervious behavior in fixing defects so that such a priority or scheme may be applied to new versions of the software or other software products. Additionally, there may be no means for assigning weights based on types of defects discovered during analysis or based on project-oriented aspects.

BRIEF SUMMARY OF THE INVENTION

In accordance with an embodiment of the present invention, a method for autonomically prioritizing software defects may include applying at least one static analysis tool to a body of source code to generate a report in response to any perceived defects. The method may also include performing a delta analysis on a group of data. The group of data may include the report, a previously generated report and one of a default priority scheme and a previously generated priority list to generate a refined priority list of types of software defects. The default priority scheme may be used in performing an initial delta analysis.

In accordance with another embodiment of the present invention, a system for autonomically prioritizing software defects may include at least one static analysis tool applicable to a body of source code to generate a report in response to perceived defects in the body of source code. The system may also include an autonomic software defect prioritization module to perform at least a delta analysis on a group of data. The group of data may include the report, a previously generated report and one of a default priority scheme and a previously generated priority list to generate a refined priority list of types of software defects.

In accordance with another embodiment of the present invention, a computer program product to autonomically prioritize software defects may include a computer usable medium having computer usable program code embodied therein. The computer usable medium may include computer usable program code configured to perform at least one static analysis on a body of source code to generate a report in response to any perceived defects. The computer usable medium may also include computer usable program code configured to perform a delta analysis on a group of data. The group of data may include the report, a previously generated report and one of a default priority scheme and a previously generated priority list to generate a refined priority list of types of software defects.

Other aspects and features of the present invention, as defined solely by the claims, will become apparent to those ordinarily skilled in the art upon review of the following non-limited detailed description of the invention in conjunction with the accompanying figures.

BRIEF DESCRIPTION OF THE SEVERAL VIEWS OF THE DRAWINGS

FIG. 1 is a flow chart of an example of a method for autonomically prioritizing software defects in accordance with an embodiment of the present invention.

FIGS. 2A and 2B are a flow chart of an example of a method for autonomically prioritizing software defects in accordance with another embodiment of the present invention.

DETAILED DESCRIPTION OF THE INVENTION

Figure 3A:
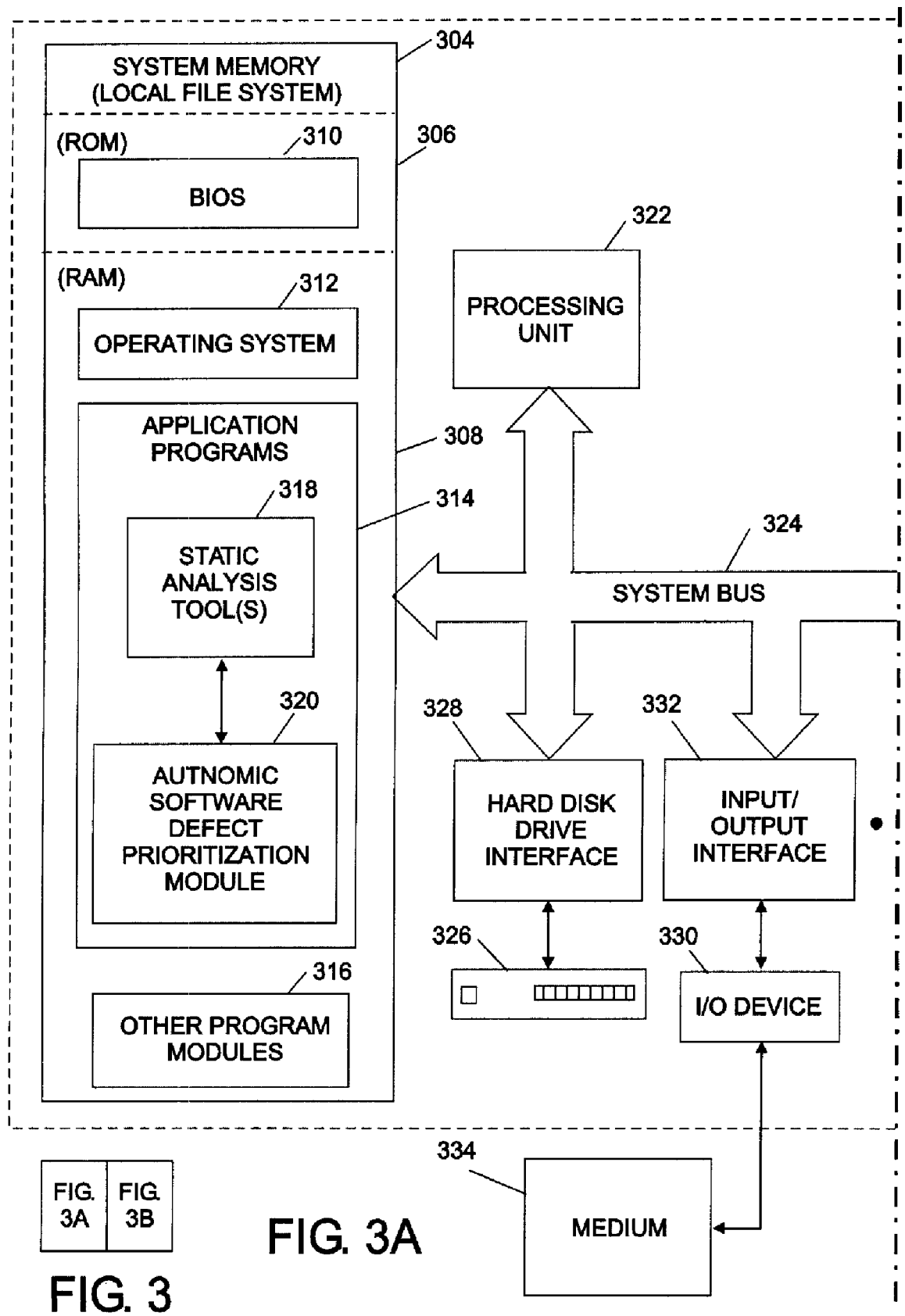
FIGS. 3A and 3B (collectively FIG. 3) are a block diagram of an exemplary system for autonomically prioritizing software defects in accordance with an embodiment of the present invention.

The following detailed description of embodiments refers to the accompanying drawings, which illustrate specific embodiments of the invention. Other embodiments having different structures and operations do not depart from the scope of the present invention.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable storage medium may be utilized. The computer-usable or computer-readable storage medium may be, for example but not limited to, an electronic, magnetic, optical, electromagnetic, infrared, or semiconductor system, apparatus, device, or any suitable combination of these. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, or a magnetic storage device. Note that the computer-usable or computer-readable storage medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable storage medium may be any medium that can contain, or store, the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a flow chart of an example of a method 100 for autonomically prioritizing software defects in accordance with an embodiment of the present invention. A body of source code 102a designated "SOURCE CODE 1" in FIG. 1 may be analyzed by at least one static analysis tool 104 to generate a report 106a designated "REPORT 1" in FIG. 1. Examples of the static analysis tool may include FindBugs, Parasoft Jtest, C++ Test or the like. The report 106a may include defect data based on any defects perceived by the static analysis tool 104 or tools. A default priority scheme 108 may be applied to the defects detected. The current version of the source code 102a may then be updated or modified to correct at least those defects with a higher priority based on the default priority scheme 108 to provide a modified or new version of the source code 102b designated "SOURCE CODE 2" in FIG. 1. Source code 102b may be the result of typical software development or software lifecycle updates. The static analysis 104 may be applied to the new source code 102b to generate another report 106b that is designated "REPORT 2" in FIG. 1.

A delta analysis 110a may be performed on a group of data that may include the current report 106b, the previously generated report 106a and the default priority scheme to generate a new or refined priority list 112 of defects or types of defects. The delta analysis 110a may include comparing the defect data in report 106a and 106b for differences, identifying those differences, and applying the default priority scheme 108. The differences between the reports 106a and 106b may include defects or types of defects that were present on the previously generated report 106a but are absent on the current report 106b. The differences may also include new defects or types of defects that may have resulted from updates or revisions to the body of source code 102 and other differences. The priority list 112 is updated to reflect raised priority for types of defects that were actually fixed and lowered priority for defects that were not.

The source code 102b may be further update or developed to correct the defects or types of defects still perceived to be in the source code 102b or to correct any new defects as a result of modifying or updating the previous source code 102a. A new version or updated source code 102c ("SOURCE CODE 3") may be generated by correcting the defects or otherwise modifying the code as part of the software development or lifecycle updating.

The static analysis 104 may be applied to the updated source code 102c to generate another report 106c ("REPORT 3") in response to any perceived defects. Another delta analysis 110b may be performed using the current report 106c (REPORT 3) and the previously generated report 106b (REPORT 2) and applying the previously generated priority list 112 to generate a new refined priority list 114.

The source code 102 may continue to be updated or modified as part of the typical software development or lifecycle updates. With each new version or update of the source code 102, another iteration 116 of the process or method 100 may be performed as described above to further refine the priority list 118 or until a final source code 120 may be realized.

FIGS. 2A and 2B are a flow chart of an example of a method 200 for autonomically prioritizing software defects in accordance with another embodiment of the present invention. Features or elements of the method 200 may be embodied in the method 100 of FIG. 1. In block 202, a static analysis tool or different static analysis tools may be applied to a body of source code to generate data corresponding to perceived defects in the code based on characteristics or features of the static analysis tool or tools applied. The static analysis tools may be similar to those previously described.

In block 204, defect data from each static analysis tool may be collated if more than one tool is used to analyze the body of source code. The defect data may be also be prioritized based on types of defects or based on other criteria.

In block 206, predetermined weightings may be applied to different types of defects. Weightings applied or assigned may be based on prior runs or iterations of the process or method 200, previous priority lists or other criteria. For example, defects or types of defects previously present on a priority list but now absent because they may have been fixed may be assigned a weighting higher than other types of defects still on the priority list or new to the list as a result of modifications or updates to the source code. Weightings may also be assigned to defects or types of defects based on project-oriented aspects, such as stability of the source code, performance of the code, ease of installation or similar project-oriented aspects or other aspects related to the source code or product.

In block 208, a report may be generated in response to the prioritization of different types of defects and/or application of any weightings. Remaining defects and any new defects may be reordered resulting from new development activity.

In block 210, a delta analysis may be performed on the current report, a previously generated report and previously generated priority list to generate a refined priority list 212 of types of software defects. The delta analysis may involve comparing differences between the current report and the previously generated report to refine the previously generated priority list. The priority is raised for those defect types that were in fact fixed, and the priority is lessened for the types of defects that were not. The delta analysis may be performed on a first report and default priority scheme if the method 200 is in a first iteration or first time through the process. The refined priority list may rank order different defects or types of defects according to a level of importance in fixing or correcting the defect or type of defect. Accordingly, those defects or types of defects at the top of the priority list or those having a higher weighting may be fixed or corrected first by a software developer.

In block 214, a determination may be made whether to continue to refine the priority list 212 based on defects or types of defects on the priority list that have been there before or may be new because of correction of other defects. If a determination is made that the priority list does not need to be further refined, the method 200 may end at termination 216. If a determination is made in block 214 that the priority list 212 needs to be further refined, the method 200 may advance to block 218. In block 218, the body of source code may be modified or updated in response to the refined priority list 212. Accordingly, the refined priority list 212 may be applied to the current body of source code similar to that illustrated in FIG. 1 to provide an updated or modified version of the source code with at least the higher priority or higher weighted defects being corrected. The method 200 may then return to block 202 where the static analysis tool may be applied to the modified body of source code and the method 200 may proceed as previously described with respect to blocks 204-214 until a determination may be made in block 214 that the priority list does not need to be further refined.

In block 220, different types of defects important for correction may be identified based on an order that different types of defects may have been corrected by a developer. This may be done by observing which types of defects were rated higher than others on the priority lists and/or which defects where corrected and in what order they were corrected by the developer.

In block 222, a new default priority scheme or list may be provided based on types of defects that are important to correct. The new default priority scheme may be used in analyzing other bodies of source code.

Figure 3B:
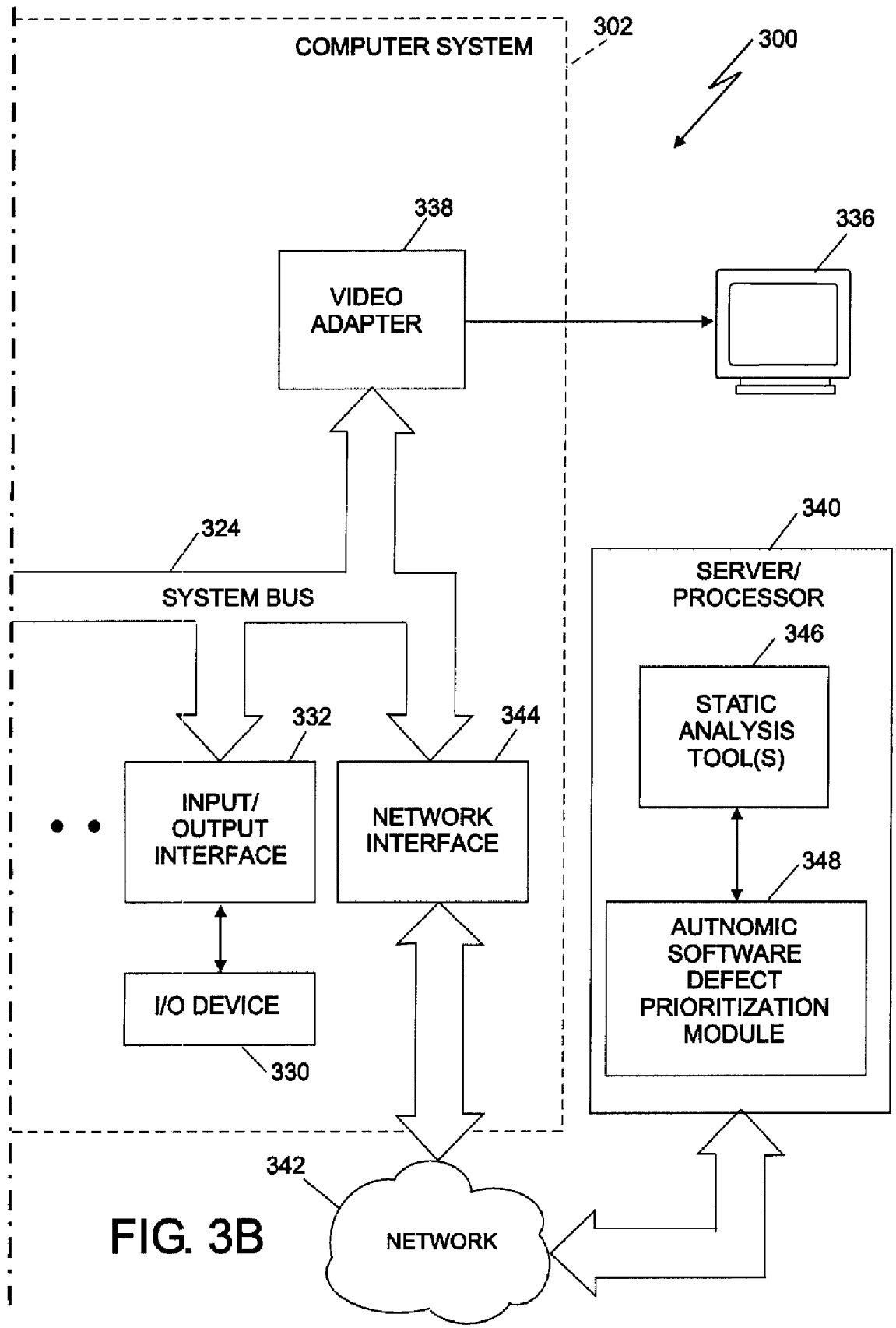

FIG. 3 is a block schematic diagram of an exemplary system 300 for autonomically prioritizing software defects in accordance with an embodiment of the present invention. The system 300 may include a computer system 302 which may be a personal computer (PC) system or the like. The computer system 302 may include a local file system or system memory 304. The system memory 304 may include a read only memory (ROM) 306 and a random access memory (RAM) 308. The ROM 306 may include a basic input/output system (BIOS) 310. The BIOS 310 may contain basic routines that help to transfer information between elements or components of the computer system 302. The RAM 308 may contain an operating system 312 to control overall operation of the computer system 302. The RAM 308 may also include application programs 314, other program modules 316, data and other files. The application programs 314 may include a static analysis tool or tools 318 and an autonomic software defect prioritization module 320. Elements and features of the methods 100 (FIG. 1) and 200 (FIG. 2) may be embodied in the static analysis tool or tools 318 and the autonomic software defect prioritization module 320.

The computer system 302 may also include a processor or processing unit 322 to control operations of the other components of the computer system 302. The processing unit 322 may be coupled to the system memory 304 and other components of the computer system 302 by a system bus 324. The computer system 302 may also include a hard drive 326. The hard drive 326 may be coupled to the system bus 324 by a hard drive interface 328. The hard drive 326 may also form part of the local file system 304. Programs, software and data may be transferred and exchanged between the system memory 304 and the hard drive 326 for operation of the computer system 302.

The computer system 302 may also include multiple input devices, output devices or combination input/output devices 330. The input/output devices 330 may be coupled to the system bus 324 by an input/output interface 332. The input and output devices or combination I/O devices 330 permit a user to operate and interface with the computer system 302 and to control operation of the static analysis tools 318 and autonomic software defect prioritization module 320. The I/O devices 330 may include a keyboard and pointing device. The I/O devices 330 may also include disk drives, optical, mechanical, magnetic, or infrared input/output devices, modems or the like. The I/O devices 330 may be used to access a medium 334. The medium 334 may contain, store, communicate or transport computer-readable or computer executable instructions or other information for use by or in connection with a system, such as the computer system 302.

The computer system 302 may also include or be connected to a display or monitor 336. The monitor 336 may be coupled to the system bus 324 by a video adapter 338. The monitor 336 may be used to permit the user to interface with the computer system 302 and to present reports from the static analysis tools and refined priority lists as described with respect to methods 100 and 200 of FIGS. 1 and 2, respectively.

The computer system 302 may communicate with a remote server or the like, such as server 340 via a network 342. The system bus 324 may be coupled to the network 342 by a network interface 344. The network interface 344 may be a modem, Ethernet card, router, gateway or the like for coupling to the network 342. The coupling may be a wired connection or wireless. The network 342 may be the Internet or private network, such as an intranet or the like.

In another embodiment of the present invention, the remote server/processor 340 may include static analysis tools 346 and autonomic software defect prioritization module 348 which may be accessed by the computer system 302 via the network 342. The elements and features of the methods 100 and 200 may be embodied in the static analysis tool or tools 346 and autonomic software defect prioritization module 348 in the server 340 or in the computer system 302 as previously described. In a further embodiment of the present invention, some of the elements or features of the methods 100 and 200 may be performed by the static analysis tools 318 and defect prioritization module 320 in the computer system 302 and some of the elements may be performed by the tools 346 and module 348 in the server.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method for autonomically prioritizing software defects, comprising:
    applying at least one static analysis tool to a body of source code to generate a report in response to any perceived defects;
    performing a delta analysis on a group of data comprising the report, a previously generated report and one of a default priority scheme and a previously generated priority list to generate a refined priority list of types of software defects; and
    assigning a predetermined weighting to each of different types of defects presented on the previously generated priority list but absent on a currently generated priority list that is higher than a predetermined weighting assigned to each of other types of defects on the currently generated priority list, defects absent on the currently generated priority list having been fixed or corrected, and wherein the refined priority list comprises types of defects presented on the previously generated priority list but absent on the currently generated priority list to provide a rank order of types of defects according to the predetermined weighting assigned to each of the types of defects, the predetermined weighting assigned corresponding to a level of importance in fixing the tyre of defect and;
    continuing to refine the priority list to further include defects in response to a current priority list containing any defects warranting correction.

2. The method of claim 1, further comprising using the default priority scheme in performing an initial delta analysis.

3. The method of claim 1, further comprising collating defect data from each static analysis tool if more than one static analysis tool is applied to the body of source code.

4. The method of claim 1, further comprising prioritizing defects based on types of defects.

5. The method of claim 1, further comprising assigning a different predetermined weighting to a type of defect according to an aspect of the body of source code to which the type of defect is applicable.

6. The method of claim 1, further comprising assigning a different predetermined weighting to each defect according to whether the defect relates to stability of the body of source code, performance of the body of source code and ease of installation of the body of source code.

7. The method of claim 1, further comprising applying weights to different types of defects based on at least one of prior static analyses and priority lists.

8. The method of claim 1, further comprising identifying types of defects important to correct based on an order different types of defects were corrected.

9. A system for autonomically prioritizing software defects, comprising: a processor;
    at least one static analysis tool applicable to a body of source code to generate a report in response to perceived defects in the body of source code, wherein the at least one static analysis tool is stored in association with the processor and runs on the processor; and
an autonomic software defect prioritization module to perform at least a delta analysis on a group of data comprising the report, a previously generated report and one of a default priority scheme and a previously generated priority list to generate a refined priority list of types of software defects, wherein the autonomic software prioritization module is stored in association with the processor and runs on the processor and wherein the autonomic software defect prioritization module is adapted to assign a predetermined weighting to each of different types of defects presented on the previously generated priority list but absent on a currently generated priority list that is higher than a predetermined weighting assigned to each of other types of defects on the currently generated priority list, defects absent on the currently generated priority list having been fixed or corrected, and wherein the refined priority list comprises types of defects presented on the previously generated priority list but absent on the currently generated priority list to provide a rank order of types of defects according to the predetermined weighting assigned to each of the types of defects, the predetermined weighting assigned corresponding to a level of importance in fixing the type of defect, the autonomic software defect prioritization module comprises a data structure to continue to refine the priority list to further include defects in response to a current priority list containing any defects warranting correction.

10. The system of claim 9, wherein the default priority scheme is used to perform an initial delta analysis.

11. The system of claim 9, wherein the autonomic software defect prioritization module comprises a data structure to apply assign a different predetermined weight to each of different types of defects based on at least one of prior static analyses and priority lists.

12. A computer program product to autonomically prioritize software defects, the computer program product comprising:

a computer readable storage medium having computer usable program code embodied therein, the computer usable medium comprising:

computer usable program code configured to perform at least one static analysis on a body of source code to generate a report in response to any perceived defects;

computer usable program code configured to perform a delta analysis on a group of data comprising the report, a previously generated report and one of a default priority scheme and a previously generated priority list to generate a refined priority list of types of software defects; and computer usable program code configured to assign a predetermined weighting to each of different types of defects presented on the previously generated priority list but absent on a currently generated priority list that is higher than a weighting assigned to each of other types of defects on the currently generated priority list, defects absent on the currently generated priority list having been fixed or corrected, and wherein the refined priority list comprises types of defects presented on the previously generated priority list but absent on the currently generated priority list to provide a rank order of types of defects according to the predetermined weighting assigned to each of the types of defects, the predetermined weighting assigned corresponding to a level of importance in fixing the tyre of defect;

the computer usable program code is further configured to continue to refine the priority list to further include defects in response to a current priority list containing any defects warranting correction.

13. The computer program product of claim 12, further comprising computer usable program code configured to facilitate prioritizing defects based on types of defects.

14. The computer program product of claim 12, further comprising computer usable program code configured to facilitate assigning a different predetermined weighting to each defect according to whether the defect relates to stability of the body of source code, performance of the body of source code and ease of installation of the body of source code.

15. The computer program product of claim 12, further comprising computer usable program code configured to facilitate assigning a different predetermined weighting to different types of defects based on at least one of prior static analyses and priority lists.

* * * * *